United States Patent [19]

Mikes et al.

[11] 4,104,209

[45] Aug. 1, 1978

[54] HIGHLY POROUS ION EXCHANGE RESINS PREPARED BY SUSPENSION POLYMERIZATION IN THE PRESENCE OF LINEAR POLYMER

[75] Inventors: John A. Mikes, Cherry Hill; Albert H. Greer, Haddonfield, both of N.J.; Amos Norwood, Philadelphia, Pa.

[73] Assignee: Sybron Corporation, Rochester, N.Y.

[21] Appl. No.: 703,067

[22] Filed: Jul. 6, 1976

[51] Int. Cl.² .............................................. C08J 9/00
[52] U.S. Cl. ..................................... 521/62; 521/63; 521/28; 521/30
[58] Field of Search ....... 260/2.1 R, 2.5 HA, 2.5 HB; 526/199, 200, 201, 202, 14, 42

[56] References Cited

U.S. PATENT DOCUMENTS

| | | |
|---|---|---|
| 3,791,999 | 2/1974 | Fuchiwak et al. .................... 526/201 |
| 3,857,824 | 12/1974 | Atkins .................................. 526/201 |
| 3,862,924 | 1/1975 | Hamann et al. ..................... 260/17 R |

*Primary Examiner*—Joseph L. Schofer
*Assistant Examiner*—Peter F. Kulkosky
*Attorney, Agent, or Firm*—Theodore B. Roessel; Papan Devnani

[57] ABSTRACT

A process for the preparation of an ion exchange resin of higher porosity and purity is described. The porosity is achieved by inserting polar, preferably hydrolyzable linear polymer into the polymerizing phase. The insert is later extracted from the polymerized beads.

6 Claims, No Drawings

HIGHLY POROUS ION EXCHANGE RESINS PREPARED BY SUSPENSION POLYMERIZATION IN THE PRESENCE OF LINEAR POLYMER

BACKGROUND OF THE INVENTION

This invention relates to synthetic resin articles having a porous structure of the general type previously referred to in the art as macroporous, macroreticular, or as having microscopic channels. Such articles hereinafter referred to as macroporous articles have been found to possess certain advantages when compared to prior art gel or "microporous" resins. The most prominent of these advantages is increased mechanical strength while maintaining permeability to fluids. This in turn facilitates the flow and diffusion of liquid phases through the resin article and enhances the usefulness of such articles for processes such as ion exchange, absorption, adsorption, catalysis, etc.

More specifically, the invention relates to crosslinked porous polymers wherein porosity is introduced by a polar preferably hydrolyzable linear polymer additive in the monomer mixture which may be later removed from the porous crosslinked body.

The prior art teaches various methods of making crosslinked macroporous resins. The process is generally carried out by the following steps (a) polymerization of styrene/divinyl benzene in the presence of linear apolar preformed polymer (b) removal of preformed linear polymer (c) conversion of crosslinked polymer to cation or anion resin. Such processes are described in U.S. Pat. No. 3,122,514 (Abrams), Hungarian Pat. No. 142,661 and British patent specification No. 1,082,635. It has been found in the prior art that the removal of preformed linear polymer from the linear polymer and resin matrix mixture is hindered due to the apolar character of both the linear polymer and resin mixture which forms a continuous phase of chemically similar matter. If the extraction of linear polymer is not done efficiently, the linear apolar polymer such as polystyrene forms a slime and impurity during the chemical transformation of the polymer thus affecting the quality of ion exchange resin made out of it. Another deficiency of the systems of the prior art is that due to smooth and continuous compatibility between the insert and matrix no real interfaces are formed by the two materials thus causing poor porosity in the resin after the extraction of the insert. The drawbacks of the prior art are overcome in the present invention by providing a high porosity and larger pore diameter resin.

SUMMARY OF THE INVENTION

A mixture of mono-olefinic monomers, polyolefinic monomers, a solvent, a linear polymer and initiators form a liquid monomer phase which is combined with an aqueous phase comprising of water, alkali earth metal salts and hydrophilic polymers to form a suspension which is polymerized to form the macroporous beads. The porosity of the beads is increased by removing the added linear polymer component.

OBJECTS OF THE INVENTION

It is thus an object of this invention to provide an ion exchange resin of high porosity and purity.

It is another object of this invention to provide a resin having larger pore diameters than those obtained by apolar linear polymer inserts and more uniform pore distribution than that obtained by the precipitating solvent method.

It is a further object of this invention to provide a macroporous resin having higher mechanical strength despite higher porosity.

It is yet another object of the invention to provide a macroporous resin having a physical pore surface, suitable for particle movement in the pores.

It is yet a further object of the invention to provide a system of causing porosity in a resin matrix where the pore formation exceeds the volume of the polar polymer insert molecule.

We have found that the objects and advantages of this invention are achieved by inserting polar, preferably hydrolyzable linear polymers into the polymerizing phase. This causes better extractability of insert, especially after hydrolysis thus making the pore formation in the matrix controllable in forming uniform pores and better quality resin matrix. The polar/apolar interface results in a phase separation between the matrix and insert. Such a phase separation facilitates the shrinking of the polymerizing matrix to withdraw from the insert. The method is so effective that the polymers with polar insert showed porosity, without the extraction of insert from it, while a similar polymer with polystyrene did not produce measurable porosity without the extraction of the polystyrene. Thus, the pore formation exceeds the volume of the polar polymer insert molecules. This has been demonstrated by porosity values measured without the removal of the additive. The separation interface also facilitates the development of a physical pore surface suitable for particle movement in the pores. It also helps the extraction of the insert both by the reduced and non-intrinsic adherance to the matrix causing a larger pore diameter than that obtained by using conventional inserts such as polystyrene. We have also found that if we choose a polymer insert with hydrolyzable molecular composition, the extraction occurs with reduced molecular size species. For example, a cellulose derivative as insert will hydrolyze under acidic or alkaline treatment to oligomers, or even monomeric sugar compounds, the removal of which is much easier than an extraction of a MW 70,000 polymethyl methacrylate from a compatible crosslinked acrylate matrix. Should the present invention be utilized without applying hydrolysis prior to the extraction, the advantages are obvious even in such cases: we get fair pores with a lower molecular weight polar insert than with a compatible apolar chain molecule due to the mentioned separation along with pore walls, and the said separation facilitates the penetration of the extractant.

Besides the mentioned cellulose derivatives, according to this invention polyamides, polyesters, ionene polymers, condensation polymers with the option of a hydrolysis are preferably used, but we may also obtain the pore forming and easy-to-extract benefits with polyvinyl pyrrolidone, polyvinyl pyridine, derivatives of sulfonated or aminated linear polymers and the like.

In order to identify the distinction between "polar" and "apolar" as pertaining to this invention, we found an indicator in the dielectric constant of the polymer to be added for pore forming. In our experiments, polymers producing a phase-separation pore interface with or without hydrolyzability, usable as pore-formants in the process described in this invention, have dielectric constants above 3.3 at $10^6$ Hz while those polymers with lower dielectric constants make only compatible inlays in most ion exchange resin matrices. The following table, though not limiting, illustrates such a choice of polymers.

| | Polymer | Dielectric Constant at $10^6$ Hz |
|---|---|---|
| I. Applicable | Nylons | 3.6 |
| | Caprolactam polymers | 4.4 |
| | Aliphatic Polyesters | 3.9 |
| | Cellulose Acetate | 4.5 |
| | Cellulose Acetate Butyrate | 4.7 |
| | Cellulose Nitrate | 6.2 |
| | Vinyl Pyridine Polymers | 5.4 |
| II. Not applicable | Acrylic esters | 3.2 |
| | Methacrylic esters | 3.1 |
| | Aromatic Polyesters | 3.1 |
| | Rubber | 3.0 |
| | Polystyrene | 2.7 |
| | Polyethylene | 2.3 |

The bead polymerization may proceed in the usual manner by reacting a mixture of monomers containing at least partly, more than one ethylenically unsaturated double bonds per monomeric molecule dispersed in form of droplets in a medium inert to the polymerization process. Application of the invention, however, is not restricted to bead form polymers, any shape may be formed with the said polar linear polymer pore forming inserts. The linear polar polymers are suspended in the monomer phase, and preferably dissolved in it. The invention allows the use of solvents beside the polar linear polymer, both swelling the final matrix and the so-called "precipitating" ones. Molecular weight and choice of the linear insert is a matter of judgment depending upon the nature of the monomers and the desired porosity. It has to be adjusted to the given system, though the variation of these parameters does not affect the applicability of the invention. An initiator is preferably used to induce the polymerization process. Peroxides, azo-compounds, radiation, redox systems or living radicals can equally be used.

Porosity in crosslinked polymers, as defined in this application, may be characterized by the volume of an inert-compatible solvent absorbed by a dry polymer without swelling it. Octane was used in most porosity measurements included in this work. The dry polymer is soaked in octane, the bubbles eliminated by the intermittent application of vacuum, filtered in a brief centrifuging cycle and weighed. The weight difference between dry and octane containing polymer over the density of octane, referred to one gram dry polymer is called "octane porosity" in the following. Porosity of an ion exchanger may be measured with methanol, if octane is not suitable due to the polarity of the resin.

Some comparative measurements:
Amberlite 200 (cation exchanger product of Rohm & Haas Co.): 0.62ml/g
Dow MWA-1(4066) (Anion exchanger product of Dow Chem. Co.) 0.45ml/g
Typical non-porous gel-type exchanger: 0.03ml/g The polar polymer additives are used alone or in combination with solvents. Both matrix-swelling and non-swelling solvents are used. An example is given for the synergistic effect of the proper use of solvents in Example 6 wherein a 1:2 mixture of non-swelling to swelling solvent is used in Part A. Ten percent of the same solvent mixture is replaced by cellulose acetate butyrate in Part B, keeping the rest of the process identical. The porosity value of polymer A was 0.142 ml/g, that of polymer B was 0.569 ml/g. The ion exchange capacities were identical: 4.6 meq/g - 2.3 meq/ml for both polymers. The Example 7 shows that the use of solvents not only improves the porosity formation but also facilitates the extraction of the inserts whether hydrolyzed or not.

The polymers prepared by this process find utility as membrane material, ion exchange resins, gas filters, resonance proof block material etc.

The following examples show the preparation of various polymers using the concept of this invention.

EXAMPLE 1

2 parts of 70% benzoyl peroxide were dissolved in 82 parts of commercial styrene and 20 parts of 50% divinylbenzene together with 10 parts of 0.01 cp commercial cellulose acetate butyrate (50% butyrate content and 1 OH per 4 glucose units) and the solution dispersed in 400 parts of a 2.5% starch solution. Polymerization took place in six hours at 70°–80° C. The polymer consisted of white spherical beads with a porosity of 0.08 ml/g; after hydrolysis in 10% NaOH for 2 hours the porosity amounted to 0.18 ml/g pore volume. Acetic acid extraction increased the porosity to 0.221 ml/g.

EXAMPLE 2

75 parts vinylpyridine and 50 parts of 50% divinylbenzene were polymerized in the presence of 10 parts dissolved polyvinylpyridine and 0.5% azoisobutyronitrile (AIBN) at 65° C for 6 hours. The polymer showed a porosity of 0.25 ml/g after a short chloroform extraction and a porosity of 0.66 after refluxing with 10% HCl.

EXAMPLE 3

The monomer of 84 parts styrene, 8 parts 50% divinylbenzene and 8 parts ethylene glycol dimethacrylate was polymerized with the dispersion system of Examples 1-8 of U.S. Pat. No. 3,627,708 adding 20% cellulose acetobutyrate used in Example 1 of this application. After 2 hours of hydrolysis with 5% NaOH the polymer gave 0.44 ml/g porosity. Chloromethylated and aminated in the usual manner the resulting anion exchange resin had a total capacity of 4.5 meq/g and a water retention of 50%. The final product showed a porosity of 0.51 ml/g.

EXAMPLE 4

The composition of Example 3 with 15% octane additive in the monomer phase gave beads with a porosity of 0.7 ml/g after an extraction of the added cellulose acetobutyrate with methylene chloride. An anion exchange resin made according to example 3 showed a porosity value of 0.69 ml/g.

EXAMPLE 5

A. Bead polymerization was performed in 10,000 parts of a 2% potato starch solution at 65°–68° C with a dispersed monomer phase containing 3000 parts ethyl acrylate, 800 parts 50% divinylbenzene, 500 parts vinylacetate and 600 parts acrylonitrile, with 750 parts of cellulose acetate and 50 parts of benzoyl peroxide dissolved in the solution. After four hours of polymerization the beads are filtered and washed. Pore volume of the untreated opaque beads was 0.11 ml/g, and after extraction with solvent it was 0.14 ml/g.

B. 130 parts of the dry polymer was heated in 400 parts of diethylene triamine at 205° C for eight hours, with a descending condenser, the liquid was then cooled down to 65° C and 200 parts of water added gradually. The beads were filtered and extracted with water. Porosity of the yellowish opaque beads gave 0.1 ml/g octane adsorption, ion exchange capacity: 2.6 meq/ml (42 kg/cu ft as $CaCO_3$).

C. 100 parts of the dry polymer of section A. was wetted with dimethyl formamide (DMF) and heated to 125° C in 200 grams 40% NaOH in a closed autoclave for 12 hours. When cooled below 100° C, the mixture was gradually diluted 1:1 with 20% NaCl then filtered at room temperature, and washed with decreasing salt concentration to neutral. The semi-opaque beads produced 7.9 meq/g cation exchange capacity.

EXAMPLE 6

Polymer A. 75 parts 2-vinyl pyridine, 25 parts 50% technical divinylbenzene, 17.5 parts heptane, 35 parts ethyl benzene and 0.8 parts AIBN phase were dispersed in a suitable aqueous phase and polymerized at 60° C for 5 hours. A subsequent steaming removed the solvents from the opaque beads.

Polymer B. 75 parts 2-vinyl pyridine, 25 parts 50% technical divinylbenzene, 16 parts heptane, 31.5 parts ethyl benzene with 5 parts cellulose acetate butyrate and 0.8 parts AIBN dissolved, were dispersed in a similar aqueous phase as in part A. and polymerized at 60° C for 5 hours. A subsequent steaming removed the solvents, and methylene chloride extraction removed the cellulose ester.

|  | Polymer A | Polymer B |
| --- | --- | --- |
| Porosity | 0.142 ml/g | 0.570 ml/g |
| Ion exchange | 4.5 meq/g | 4.6 meq/g |
|  | 2.4 meq/ml | 2.34 meq/ml |
| Crushing strength (chatillon test) 1600 g/bead load | not crushed | not crushed |

EXAMPLE 7

The following table illustrates the synergistic effect of polar linear polymer and solvent compositions in pore forming.

Table 1

| Experiment No. | Method (Example No.) | % DVB | % Solvent | % Polar Polymer | Porosity ml/g | Synergistic effect |
| --- | --- | --- | --- | --- | --- | --- |
| 1 | 6 | 12.5 | 17.5(a) 35(b) | — | 0.142 | No |
| 2 | 6 | 12.5 | 17.5(a) 41(b) | 5(e) | 0.569 | Yes |
| 3 | 6 | 12.5 | — | 15(e) | 0.143 | No |
| 4 | 6 | 12.5 | — | 20(e) | 0.156 | No |
| 5 | 1 | 16 | 20(c) | — | 0.09 | No |
| 6 | 1 | 16 | — | 6.5(e) | 0.142 | No |
| 7 | 1 | 16 | 20(c) | 6.5(e) | 0.541 | Yes |
| 8 | 1 | 16 | 27(c) | 6.5(e) | 0.850 | Yes |
| 9 | 2 | 15 | 19(d) | 15(e) | 0.570 | Yes |
| 10 | 2 | 15 | 19(d) | — | 0.159 | No |
| 11 | 2 | 15 | — | 15(e) | 0.143 | No |

(a)Heptane
(b)Ethyl benzene
(c)n-Butanol
(d)n-Octane
(e)Cellulose ester

While the invention has been described in terms of preferred embodiments thereof, it is not to be so limited since changes and alterations may be made therein which are within the full and intended scope of the appended claims.

We claim:

1. A process for the preparation of crosslinked copolymer beads suitable for conversion to ion exchange resins having improved mechanical properties, improved chemical properties and porosity of 0.14 to 0.85 ml/g by octane absorption which comprises the steps of
   (a) forming a liquid monomer phase comprising:
      i. a mixture of mono-olefinic monomer(s) and at least one poly-olefinic monomer which are miscible and copolymerizable, said mono-olefinic monomer selected from a group consisting of mono-vinyl aromatic hydrocarbons, mono-vinyl heterocylic compounds, and (meth)acrylic esters, and said polyolefinic monomers selected from the group consisting of polyvinyl aromatic hydrocarbons, poly(meth)acrylates and polyvinyl heterocylic compounds,
      ii. from 5–20 parts by weight of total monomers of a linear polymer component selected from a group consisting of cellulose acetate butyrate, cellulose acetate, cellulose nitrate, polycaprolactam, polyvinyl pyridine and aliphatic polyesters, dispersed and preferably dissolved in the monomer phase,
      iii. optionally an inert solvent selected from either $C_6$–$C_{10}$ hydrocarbons or $C_3$–$C_6$ monohydric alcohols, such solvent being included in amounts of 0–50 percent by weight based on the total monomer weight,
      iv. an initiator component providing free radical selected from a group consisting of peroxides, hydroperoxides, azo/nitrile compounds, and
   (b) forming a aqueous phase comprising:
      i. a major portion of water
      ii. salts of alkali and/or alkali earth metals
      iii. hydrophilic polymer(s) selected from a group consisting of gelatin, casein, starch, polyvinyl alcohol, maleic acid copolymer(s), poly(meth)acrylic acid derivatives; and
   (c) combining said monomer phase (a) and said aqueous phase (b) to form a suspension of said monomer phase in said aqueous phase and
   (d) heating said suspension to polymerization temperature of between 50° C and 90° C while stirring said dispersion to form a multiplicity of macroporous polymer beads, and
   (e) separating said macroporous beads from the aqueous phase.

2. The process of claim 1 wherein the porosity of the resulting macroporous beads is increased subsequent to the polymerization by removing the added linear polymer component by leaching and/or heating the beads dispersed in an alkaline aqueous medium.

3. The process of claim 1 wherein the porosity of the resulting macroporous beads is increased subsequent to the polymerization by removing the added linear polymer component by leaching and/or heating the beads in an acidic aqueous medium.

4. The process of claim 1 wherein the porosity of the resulting macroporous beads is increased subsequent to the polymerization by removing the added linear polymer component by leaching and/or heating the beads in an organic liquid which is a solvent of said linear polymer.

5. The process of claim 1 wherein the porosity of the resulting macroporous beads is increased subsequent to the polymerization by removing the added linear polymer component by decomposing and/or removing said linear polymer by reaction media used for the chemical transformation of the beads into ion exchangers, adsorbents, and macroporous polymer beads of other purposes.

6. The process of claim 1 wherein said mono olefinic monomer is styrene and said polyolefinic monomer is divinylbenzene.

* * * * *